(12) United States Patent
Komatsu et al.

(10) Patent No.: US 7,290,909 B2
(45) Date of Patent: Nov. 6, 2007

(54) VEHICLE HEADLAMP

(75) Inventors: Motohiro Komatsu, Shizuoka (JP);
Kazuki Okui, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 2 days.

(21) Appl. No.: 11/430,927

(22) Filed: May 10, 2006

(65) Prior Publication Data

US 2006/0262552 A1 Nov. 23, 2006

(30) Foreign Application Priority Data

May 18, 2005 (JP) .......................... P.2005-145546

(51) Int. Cl.
*F21V 13/04* (2006.01)
(52) U.S. Cl. ....................... 362/538; 362/539
(58) Field of Classification Search ................ 362/538, 362/539
See application file for complete search history.

(56) References Cited

U.S. PATENT DOCUMENTS 6,910,791 B2 * 6/2005 Futami ....................... 362/517
7,168,832 B2 * 1/2007 Komatsu et al. ............ 362/507
2003/0174509 A1 9/2003 Futami
2005/0190572 A1 9/2005 Komatsu et al.

FOREIGN PATENT DOCUMENTS

| EP | 0 950 847 A3 | 10/1999 |
| JP | 2001-52506 A | 2/2001 |
| JP | 2002-358806 A | 12/2002 |

* cited by examiner

*Primary Examiner*—Hargobind S. Sawhney
(74) *Attorney, Agent, or Firm*—Sughrue Mion, PLLC

(57) ABSTRACT

Light emitted from a light source 12a is sequentially reflected on a first, second, and third additional reflectors in this order. By emitting light in the order of the reflectors, this allows the light to be parallel to an optical axis by an additional lens. Accordingly, it is possible to increase the light-emitting area of the entire headlamp, thereby improving the appearance of the headlamp with respect to the driver of the oncoming vehicle. The additional lens is formed to have a substantially wedge-shaped cross-section, and is provided along the surface shape of a projection lens. Furthermore, since the light emitted from the light source is sequentially reflected by the first, second, and third additional reflectors in this order, the light emitted from the light source can be focused and the quantity of the light passing through the additional lens is not excessively increased.

11 Claims, 12 Drawing Sheets

VEHICLE HEADLAMP

The present application claims foreign priority based on Japanese Patent Application No. P.2005-145546, filed on May 18, 2005, the contents of which are incorporated herein by reference.

BACKGROUND OF THE INVENTION

1. Field of the Invention

The present invention relates to a projector-type vehicle headlamp.

2. Related Art

A projector-type vehicle headlamp is generally provided with a projection lens disposed on an optical axis extending in a longitudinal direction of a vehicle, and a light source disposed on a rear side of a rear focal point of the projection lens, and light emitted from the light source is reflected by a reflector toward the optical axis.

Disclosed in JP-A-2002-358806 is a projector-type vehicle headlamp provided with an annular additional lens on an outer periphery of the projection lens so that the light emitted from the light source passes through the additional lens travels toward a front side thereof substantially parallel to the optical axis.

In the vehicle headlamp of JP-A-2002-358806, a first additional reflector is provided on a rear side of the projection lens and in a vicinity of an outer peripheral edge of the projection lens, and reflects direct light emitted from the light source toward a rear side thereof in a direction in which the light is apart from the optical axis. Furthermore, a second additional reflector is provided on a rear side of the first additional reflector, and reflects the light reflected on the first additional reflector toward a front side thereof. Accordingly, the light emitted from the light source is sequentially reflected by the first and second additional reflectors in this order, and then travels to the additional lens.

When a headlamp is lighted, a projection lens of a conventional projector-type vehicle headlamp is illuminated and visible. However, if the additional lens is provided on the outer periphery of the projection lens as disclosed in JP-A-2002-358806, it is possible to increase the light-emitting area of an entire headlamp as much as a quantity of the light passing through the additional lens. As a result, it is possible to improve an appearance of the headlamp with respect to a driver of an oncoming vehicle, thereby further improving the safety conditions during the driving of a vehicle.

However, since the additional lens of the vehicle headlamp disclosed in JP-A-2002-358806 is composed of an annular lens that is formed to have a cross-section of a general plano-convex lens, there has been a problem that it is not possible to dispose the additional lens continuously along a surface shape of the projection lens.

In addition, the light passing through the additional lens is not used as light that radiates toward the front side of the headlamp, but is used to improve the appearance of the headlamp with respect to the driver of the oncoming vehicle. From this point of view, the quantity of the light passing through the additional lens may be small. If the light passing through the additional lens is intense, the headlamp causes glare to the driver of the oncoming vehicle. Accordingly, it is important to consider the driver of the oncoming vehicle.

SUMMARY OF THE INVENTION

One or more embodiments of the present invention provide a projector-type vehicle headlamp in which an additional lens disposed on an outer periphery of a projection lens can be disposed along a surface shape of a projection lens so as to improve an appearance of the headlamp and a quantity of the light passing through the additional lens is not excessively increased.

Further, in accordance with one or more embodiments of the present invention, the additional lens is formed to have a substantially wedge-shaped cross-section.

In accordance with one or more embodiments of the present invention, a vehicle headlamp is provided with: a projection lens disposed on an optical axis extending in a longitudinal direction of a vehicle; a light source disposed on a rear side of a rear focal point of the projection lens; a reflector, wherein light from the light source is reflected on the reflector to a front side toward the optical axis; a first additional reflector provided on a rear side of the light source, wherein the light from the light source is reflected on the first additional reflector in a direction apart from the optical axis; a second additional reflector provided on a rear side of the projection lens and in a vicinity of an outer peripheral edge of the projection lens, wherein the light reflected on the first additional reflector is reflected on the second additional reflector to a rear side of the second additional reflector in a direction apart from the optical axis; a third additional reflector provided on a rear side of the second additional reflector, wherein the light reflected on the second additional reflector is reflected on the third additional reflector to a front side of the third additional reflector; and an additional lens provided on an outer periphery of the projection lens and having a substantially wedge-shaped cross-section, wherein the light reflected on the third additional reflector passes through the additional lens and travels to a front side of the additional lens, substantially parallel to the optical axis.

The kind of 'light source' is not limited to a specific one. For example, a light-emitting part of a discharge bulb or a halogen bulb, a light-emitting chip of a light-emitting element such as a light emitting diode, or the like may be used as the light source. In addition, if only the 'light source' is disposed on the rear side of a rear focal point of the projection lens, the position and direction of the light source are not limited to specific ones. For example, the light source may be disposed on the optical axis, and may be disposed at a position outside of the optical axis.

In accordance with one or more embodiments of the present invention, if only the 'additional lens' is composed of a lens, which has a substantially wedge-shaped cross-section and is provided on the periphery of the projection lens, and reflects the light, which is emitted from the light source and is then sequentially reflected by the first, second, and third additional reflectors in this order, toward the front side in the form of light substantially parallel to the optical axis, the structure of the additional lens is not limited to a specific one. Furthermore, the 'additional lens' may be formed to have an annular shape on the overall periphery of the projection lens, and may be formed on the partial periphery thereof.

The 'substantially wedge-shaped cross-section' means that the cross-section taken along a plane including the optical axis is set in the wedge shape.

In the vehicle headlamp according to one or more embodiments of the present invention, the projection lens is disposed on the optical axis extending in the longitudinal direction of the vehicle, and the light source is disposed on the rear side of the rear focal point of the projection lens such that the light emitted from the light source is reflected toward the front side of the reflector and the optical axis. The first additional reflector is provided on the rear side of the light source, and reflects the light emitted from the light source toward the front side in the direction in which the light is apart from the optical axis. The second additional reflector is provided on the rear side of the projection lens and in the vicinity of the outer peripheral edge of the projection lens, and reflects the light, which is emitted from the light source and reflected by the first additional reflector, toward the rear side in the direction in which the light is apart from the optical axis. The third additional reflector is provided on the rear side of the second additional reflector, and reflects the light, which is reflected by the first additional reflector and reflected by the second additional reflector, toward the front side. The additional lens having a substantially wedge-shaped cross-section is provided on the outer periphery of the projection lens such that the light, which is reflected by the second additional reflector and reflected by the third additional reflector, passes therethrough and travels toward the front side thereof as light substantially parallel to the optical axis. Therefore, it is possible to obtain the following effects.

That is, the light emitted from the light source is sequentially reflected by the first, second, and third additional reflectors in this order. By emitting light in the order of the reflectors, this allows light to be parallel to the optical axis by the additional lens provided on the outer periphery of the projection lens, and travels toward the front side of the reflector. Accordingly, it is possible to increase the light-emitting area of the entire headlamp so as to be larger than that of a conventional projector-type vehicle headlamp, as much as the quantity of the light passing through the additional lens. As a result, it is possible to improve the appearance of the headlamp with respect to the driver of the oncoming vehicle, thereby improving safety conditions during the driving of a vehicle.

In this case, since the additional lens is formed so as to have a substantially wedge-shaped cross-section, it is possible to easily dispose the additional lens along the surface shape of the projection lens. Accordingly, it is possible to coordinate the designs of the additional lens and the projection lens with each other, and to reduce the size of a headlamp.

Moreover, the light emitted from the light source is sequentially reflected by the first, second, and third additional reflectors in this order, and then travels to the additional lens. Accordingly, whenever the light is reflected by each of the additional reflectors, it is possible to focus the light emitted from the light source. As a result, it is possible to properly set the quantity of the light, which is reflected by the third additional reflector and then travels to the additional lens, relatively small. For this reason, the quantity of the light passing through the additional lens can also be set properly.

According to one or more embodiments, the additional lens for improving the appearance of the projector-type vehicle headlamp may be disposed along the surface shape of the projection lens, and the quantity of the light passing through the additional lens can be controlled so as not to be excessively increased. Therefore, it is possible for the headlamp not to cause glare to the driver of the oncoming vehicle.

In the above-mentioned structure, the structure of the additional lens is not limited to a specific one as described above. However, if the additional lens is an annular lens composed of a peripheral portion of a convex meniscus lens or a portion of the annular lens and is provided along the outer peripheral edge of the projection lens, it is possible to coordinate the designs of the additional lens and the projection lens with each other, and to reduce the size of a headlamp.

In the above-mentioned structure, the structure of the reflection surfaces of the first, second, and third reflector is not limited to a specific one. However, if the following structure is employed, it is possible to lengthen the focal distance of the additional lens. In this structure, the cross-section, which is taken along a plane including the optical axis, of a reflection surface of the first additional reflector formed in the shape of a first parabola, uses an emission center of the light source as a focal point. Further, the cross-section, which is taken along a plane including the optical axis, of a reflection surface of the second additional reflector is formed in the shape of a second parabola, which uses an axis parallel to the axis of the first parabola as a symmetry axis and uses a point disposed on the rear side of the second reflector as a focal point. Furthermore, the cross-section, which is taken along a plane including the optical axis, of a reflection surface of the third additional reflector is formed in the shape of a conic section, which corresponds to a first focal point, of a hyperbola, which uses the focal point of the second parabola as a first focal point and uses a point disposed on the rear side of the light source as a second focal point. Moreover, a focal point of the additional lens is positioned in the vicinity of the second focal point of the hyperbola. Accordingly, even though the additional lens is formed to have a relatively small thickness, the light, which is reflected by the third additional reflector and then travels to the additional lens, can travel toward the front side of the reflector as light substantially parallel to the optical axis. In addition, since the additional lens is formed to have a small thickness, sinkage hardly occurs even when the additional lens is composed of an injection-molding product made of a transparent resin. As a result, it is possible to improve the optical precision of the additional lens.

Alternatively, even when the following structure is employed instead of the above-mentioned structure, it is possible to lengthen the focal distance of the additional lens. In this structure, the cross-section, which is taken along a plane including the optical axis, of a reflection surface of the first additional reflector is formed in the shape of a first ellipse, which uses an emission center of the light source as a first focal point and uses a point disposed on the front side of the first additional reflector as a second focal point. Further, the cross-section, which is taken along a plane including the optical axis, of a reflection surface of the second additional reflector is formed in the shape of a second ellipse, which uses the second focal point of the first ellipse as a first focal point and uses a point disposed on the rear side of the second additional reflector as a second focal point. Furthermore, the cross-section, which is taken along a plane including the optical axis, of a reflection surface of the third additional reflector is formed in the shape of a conic section, which corresponds to a first focal point, of a hyperbola, which uses the second focal point of the second ellipse as a first focal point and uses a point disposed on the rear side of the light source as a second focal point. In addition, a focal point of the additional lens is positioned in the vicinity of the second focal point of the hyperbola. Accordingly, even though the additional lens is formed to have a relatively small thickness, the light, which is reflected by the third additional reflector and then travels to the additional lens, can travel toward the front side of the reflector as light substantially parallel to the optical axis. In addition, since the additional lens is formed to have a small thickness, sinkage hardly occurs even when the additional lens is composed of an injection-molding product made of a transparent resin. As a result, it is possible to improve the optical precision of the additional lens.

In the above-mentioned structure, all of the emission center of the light source, the second focal point of the hyperbola, and the focal point of the additional lens are disposed on the optical axis. Accordingly, the additional lens has a constant cross-section having the substantially wedge-shape in the circumferential direction thereof, and the light passing through the additional lens can be made parallel to the optical axis.

In the above-mentioned structure, light-shielding members are provided on the rear side of the second additional reflector, and prevent light other than the light, which is emitted from the light source, and is then reflected by the first additional reflector, from traveling to the second additional reflector. Therefore, it is possible to reliably prevent the light distribution pattern, which is formed by light passing through the additional lens, from excessively illuminating. In addition, when the light source is composed of a discharge light-emitting part of the light source bulb, the enclosed materials deposited on the bottom of a discharge chamber of the light source bulb 12 serve as pseudo light sources. As a result, there is a possibility that the additional lens may shine yellow. However, since the vehicle headlamp is provided with light-shielding members, it is possible to prevent yellow light emitting from enclosed materials, which serve as pseudo light sources and are deposited on the bottom of a discharge chamber of the light source bulb, from traveling to the second additional reflector. Therefore, it is possible to prevent the additional lens from shining yellow.

In this case, the first, second, and third additional reflectors are disposed above the optical axis. Further, at least one of the light-shielding members is composed of a fourth additional reflector, which reflects direct light emitted from the light source, toward the lower side. Furthermore, a fifth additional reflector is provided below the optical axis, and reflects the light, which is emitted from the light source and reflected by the fourth additional reflector such that the light travels toward the front side of the reflector below the projection lens. Accordingly, it is possible to add the light distribution pattern formed by the light, which is emitted from the light source and is then sequentially reflected by the fourth and fifth reflectors, to the light distribution pattern formed by the light passing through the projection lens. As a result, it is possible to effectively utilize the light emitted from the light source. In this case, the shapes of the reflections of the fourth and fifth reflectors are not limited to specific types.

In the above-mentioned structure, a plurality of V-shaped grooves is formed on the surface of the additional lens so as to have a predetermined interval in the circumferential direction of the additional lens with respect to the optical axis. Therefore, when the headlamp is lighted, it is possible for the V-shaped grooves not to shine, and for the portion of the additional lens except for the additional lens to shine. As a result, it is possible for the driver of the oncoming vehicle to easily perceive that the shine of the portion corresponding to the additional lens is different from that of the corresponding the projection lens. For this reason, even when the vehicle headlamp is a projector-type vehicle headlamp, the portion except for the projection lens shines. Therefore, it is possible not to inconvenience driver of the oncoming vehicle not to feel unpleasant.

Other aspects and advantages of the invention will be apparent from the following description and the appended claims.

Figure 1:
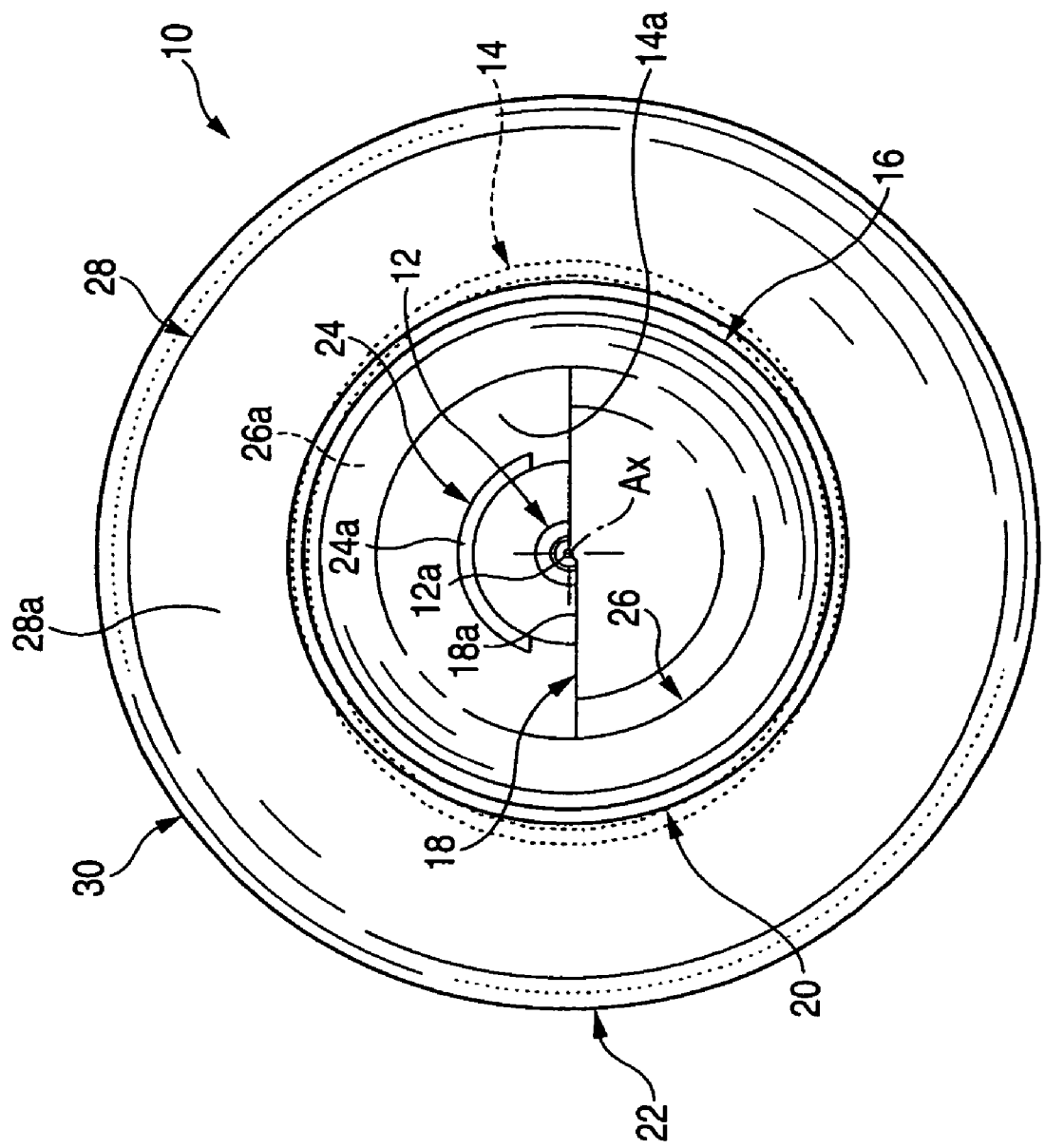
FIG. 1 is a front view showing a vehicle headlamp according to a first exemplary embodiment of the invention.

REFERENCE NUMERALS AND CHARACTERS 10, 110, 210, 310: VEHICLE HEADLAMP
12: LIGHT SOURCE BULB
12a: LIGHT SOURCE
14: REFLECTOR
14a, 24a, 26a, 28a, 124a, 126a, 128a, 226a, 228a, 234a, 236a,
324a: REFLECTION SURFACE
14b: REAR OPENING
16: PROJECTION LENS
18: SHADE
18a: UPPER EDGE
20: FIRST HOLDER
22, 222: SECOND HOLDER
24, 124, 234, 324: FIRST ADDITIONAL REFLECTOR
26, 126, 226, 326: SECOND ADDITIONAL REFLECTOR
28, 128, 228, 328: THIRD ADDITIONAL REFLECTOR
30, 230, 330: ADDITIONAL LENS
32, 232, 332: FIRST LIGHT-SHIELDING MEMBER
34, 334: SECOND LIGHT-SHIELDING MEMBER
234: SECOND LIGHT-SHIELDING MEMBER, FOURTH ADDITIONAL REFLECTOR
236: FIFTH ADDITIONAL REFLECTOR
330a: V-SHAPED GROOVE
A: EMISSION CENTER OF LIGHT SOURCE, FOCAL POINT OF FIRST PARABOLA, FIRST FOCAL POINT OF FIRST ELLIPSE
Ax: OPTICAL AXIS
Ax1: AXIS OF FIRST PARABOLA

Ax2: AXIS OF SECOND PARABOLA
Ax3: AXIS OF HYPERBOLA
B: FOCAL POINT OF SECOND PARABOLA, FOCAL POINT OF SECOND ELLIPSE, FIRST FOCAL POINT OF HYPERBOLA
C: SECOND FOCAL POINT OF HYPERBOLA, FOCAL POINT OF ADDITIONAL LENS
CL1, CL2: CUTOFF LINE
D: SECOND FOCAL POINT OF FIRST ELLIPSE, FOCAL POINT OF SECOND ELLIPSE
E: ELBOW POINT
E1: FIRST ELLIPSE
E3: SECOND ELLIPSE
F: REAR FOCAL POINT
G: FOCAL POINT OF ELLIPSOIDAL SURFACE
HZ: HOT ZONE
P1: FIRST PARABOLA
P2: SECOND PARABOLA
PL1, PL3, PL4: LOW-BEAM LIGHT DISTRIBUTION PATTERN
PO: BASIC LIGHT DISTRIBUTION PATTERN
Pa1, Pa4, Pb: ADDITIONAL LIGHT DISTRIBUTION PATTERN

DETAILED DESCRIPTION OF THE EXEMPLARY EMBODIMENTS

Exemplary embodiments of the invention will be described with reference to the accompanying drawings.

First Exemplary Embodiments

Figure 2:
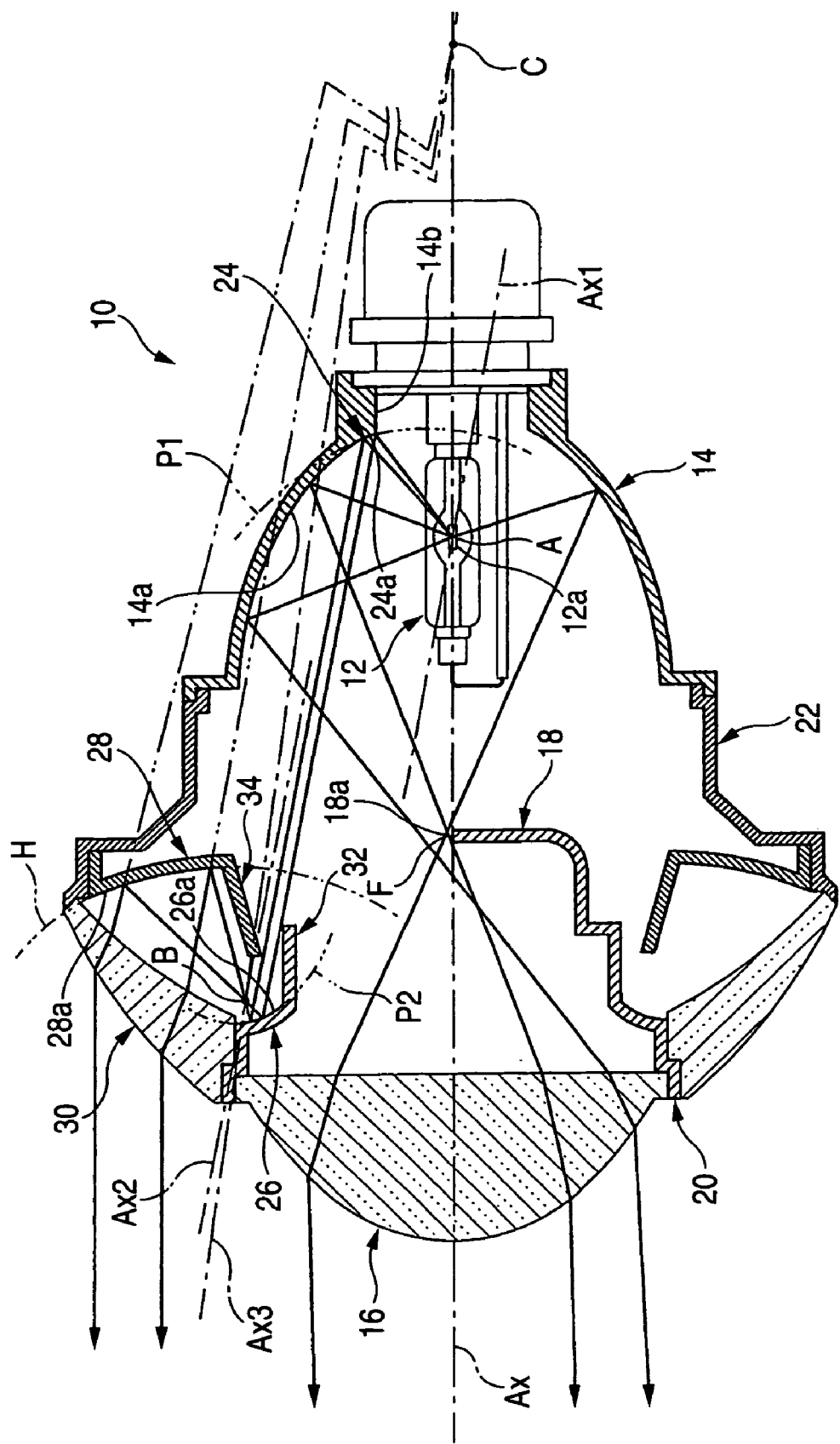
FIG. 2 is a side cross-sectional view showing the vehicle headlamp.
Figure 3:
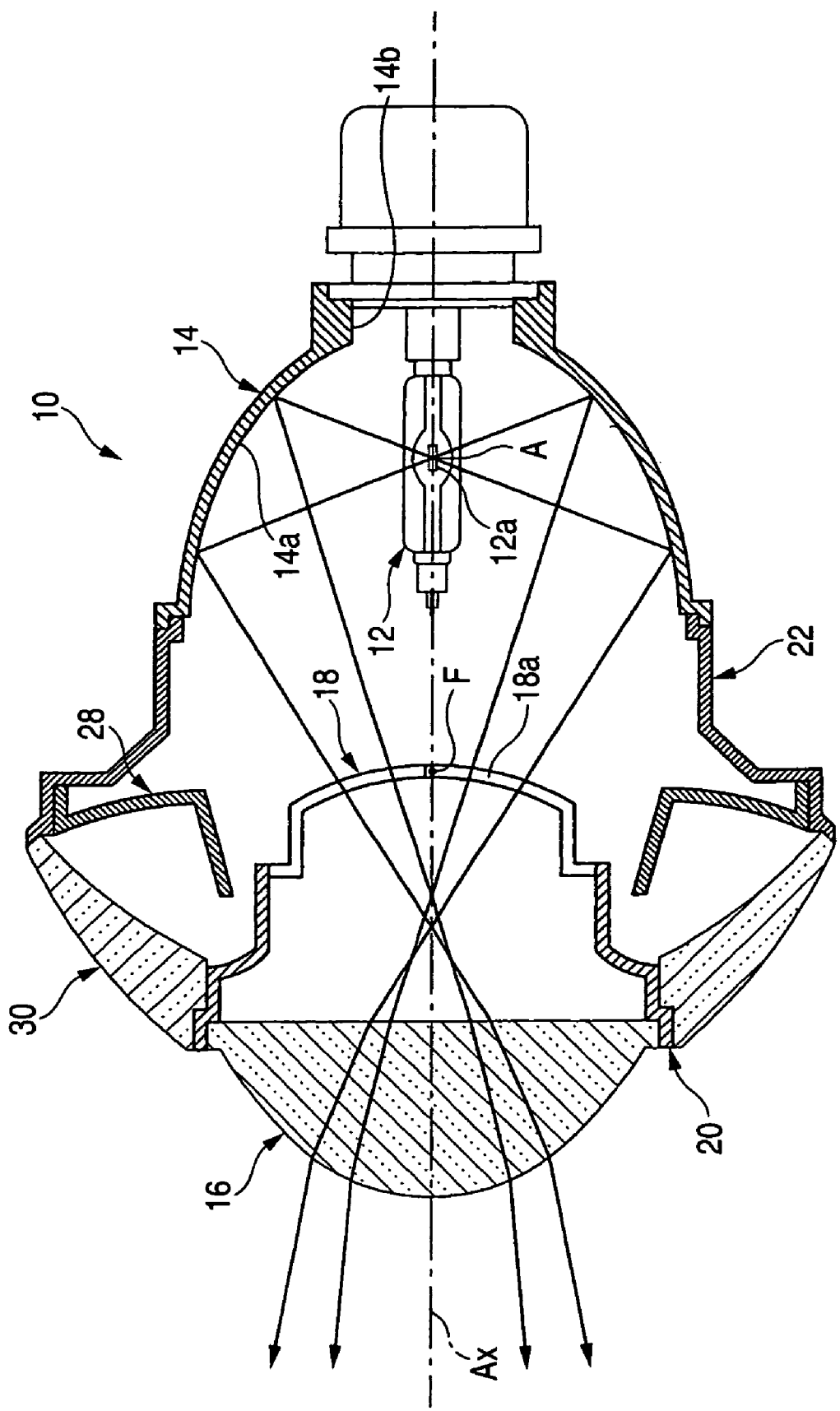
FIG. 3 is a plan cross-sectional view showing the vehicle headlamp.

FIG. 1 is a front view of a vehicle headlamp 10 according to the first exemplary embodiment, FIG. 2 is a side cross-sectional view thereof, and FIG. 3 is a plan cross-sectional view thereof.

As shown in FIGS. 1 to 3, the vehicle headlamp 10 according to the first embodiment is composed of a projector-type lamp unit, which radiates light to form a low-beam light distribution pattern, and is used in a state in which the vehicle headlamp is assembled in a lamp body (not shown).

The vehicle headlamp 10 includes a light source bulb 12, a reflector 14, a projection lens 16, a shade 18, a first holder 20, a second holder 22, a first additional reflector 24, a second additional reflector 26, a third additional reflector 28, an additional lens 30, a first light-shielding member 32, and a second light-shielding member 34. In addition, the vehicle headlamp has an optical axis Ax extending in a longitudinal direction of a vehicle. However, when adjustment of the vehicle headlamp is completed, the vehicle headlamp 10 is disposed so that the optical axis Ax extends in a direction tilted about 0.5 to 0.6° downward with respect to the longitudinal direction of the vehicle.

The projection lens 16 is composed of a plano-convex aspheric lens, which has a convex surface serving as the front surface thereof and a flat surface serving as the rear surface thereof, and is disposed on the optical axis Ax. The projection lens 16 is configured so that an image on a focal plane including a rear focal point F of the projection lens is projected on the virtual vertical screen placed ahead of the headlamp as a reversed image. The outer peripheral edge of the projection lens 16 is fixedly supported by the annular first holder 20.

The light source bulb 12 is a discharge bulb such as a metal halide bulb, which uses a discharge light-emitting part as a light source 12a, and is inserted into the rear opening 14b of the reflector 14. The light source 12a is composed of a line segment light source, which is disposed on the optical axis Ax so as to extend parallel thereto.

The reflector 14 has a reflection surface 14a for reflecting the light, which is emitted from the light source bulb 12, toward the front side of the reflector and the optical axis Ax. The reflection surface 14a is configured such that a cross-section thereof taken along the plane including the optical axis Ax is elliptical. According to the above-mentioned configuration, the light, which is emitted from the light source 12a and is then reflected by the reflection surface 14a, is substantially converged in the vicinity of the rear focal point F on a vertical cross-sectional plane, and the point of convergence is displaced toward the front side of the rear focal point F.

The shade 18 is integrally formed with the first holder 20 so as to extend from a substantially lower half portion of the first holder 20 to the rear side thereof. The shade 18 is formed such that an upper edge 18a thereof passes through the rear focal point F of the projection lens 16. Accordingly, a portion of the light reflected by the reflection surface 14a of the reflector 14 is shielded, whereby most of the upward light emitted from the projection lens 16 toward the front side thereof is removed. In this case, the upper edge 18a of the shade 18 extends along the rear focal plane of the projection lens 16 so as to have a substantial arc shape in the horizontal direction and step-shaped portions on the right and left sides thereof.

The first additional reflector 24 is provided above the optical axis Ax on the rear side of the light source 12a, and is configured so as to reflect the light emitted from the light source 12a toward the front side of the reflector in a direction in which the light is apart from the optical axis Ax. The first additional reflector 24 is formed integrally with the reflector 14, and a reflection surface 24a thereof is formed in an arc shape along the rear opening 14b at the inner peripheral edge of the reflection surface 14a of the reflector 14. In this case, the reflection surface 24a is configured such that a cross-section thereof taken along the plane including the optical axis Ax is formed in the shape of a first parabola P1, which uses an emission center A of the light source 12a as a focal point and uses an axis Ax1 inclined with respect to the optical axis Ax as a symmetry axis. As a result, the light emitted from the light source 12a is reflected in the form of collimated light. In addition, the reflection surface 24a is configured such that the circumferential edge thereof is positioned above a horizontal plane including the optical axis Ax at a predetermined distance. As a result, portions of the reflection surface 14a of the reflector 14, which are positioned on the right and left sides of the with respect to the optical axis Ax, are secured so as to serve as reflection areas for forming the low-beam light distribution pattern.

The second additional reflector 26 is provided on the rear side of the projection lens 16 and in the vicinity of the outer peripheral edge of the projection lens 16. Further, the light, which is emitted from the light source 12a and is then reflected by the first additional reflector 24, is reflected toward the rear side of the reflector in a direction in which the light is apart from the optical axis Ax. The second additional reflector 26 is an annular member using the optical axis Ax as a central axis thereof, and is integrally formed with the first holder 20. A reflection surface 26a is formed on the overall periphery of the second additional reflector 26 along the outer peripheral edge of the projection lens 16. Meanwhile, the reflection surface 24a of the first additional reflector 24 is positioned above the optical axis Ax. Accordingly, the light, which is emitted from the light source 12a and is then reflected by the first additional reflector 24, travels to only the upper area above the optical axis Ax of the reflection surface 24a of the first additional reflector 24. The reflection surface 26a is configured such that a cross-section thereof taken along the plane including the optical axis Ax is formed in the shape of a second parabola P2, which uses an axis Ax2 parallel to the axis Ax1 of the first parabola P1 as a symmetry axis and uses a point B disposed on the rear side of the second additional reflector 26 as a focal point. As a result, the collimated light reflected by the first additional reflector 24 is reflected in the form of converged light to be converged to the focal point B of the second parabola P2.

The third additional reflector 28 is provided on the rear side of the second additional reflector 26, and is configured so as to reflect the light, which is reflected by the first additional reflector 24 and is then reflected by the second additional reflector 26, toward the front side thereof. The third additional reflector 28 is an annular member using the optical axis Ax as a central axis thereof, and is fixedly supported by the second holder 22. A reflection surface 28a is formed on the overall periphery of the third additional reflector 28 so as to face the reflection surface 26a of the second additional reflector 26. In this case, the reflection surface 28a is configured such that a cross-section thereof taken along the plane including the optical axis Ax is formed in the shape of a conic section H, which corresponds to a first focal point B, of a hyperbola. The hyperbola uses the focal point B of the second parabola P2 as a first focal point, and uses a point C disposed on the optical axis Ax on the rear side of the light source 12a as a second focal point. An inclination angle between an axis Ax3 of the hyperbola H and the optical axis Ax is set slightly smaller than that between the axis Ax1 of the first parabola P1 and the optical axis Ax. Furthermore, the reflection surface 28a is configured such that the light, which travels in the form of divergent light from the first focal point B after being reflected by the second additional reflector 26 and converged to the first focal point B, is reflected in the form of divergent light from the second focal point C of the hyperbola.

The additional lens 30 is provided on the periphery of the projection lens 16 so that the light, which is reflected by the second additional reflector 26 and is then reflected by the third additional reflector 28, travels toward the front side of the reflector in the form of the light parallel to the optical axis Ax. The additional lens 30 is an annular lens having a substantially wedge-shaped cross-section, which is composed of a peripheral portion of a convex meniscus lens. The additional lens 30 is provided along the outer peripheral edge of the projection lens 16. Furthermore, the inner peripheral edge of the additional lens 30 is fixedly supported by the first holder 20, and the outer peripheral edge thereof is fixedly supported by the front end of the second holder 22. In this case, the additional lens 30 is disposed such that the focal point thereof is positioned at the second focal point C of the hyperbola. As a result, the light reflected by the third additional reflector 28 travels in the form of divergent light from the second focal point C.

The light, which is reflected by the third additional reflector 28 and then travels to the additional lens 30, is light emitted from the second focal point C, which serves as a pseudo light source, of the hyperbola. In addition, the light is divergent light, which is nearly collimated light. Accordingly, the additional lens 30 may have small refractivity to make the light parallel to the optical axis Ax. For this reason, the additional lens 30 has a relatively small thickness.

The second holder 22 has an annular shape, and the reflector 14 is fixedly supported by the rear end thereof.

The first and second light-shielding members 32 and 34 are provided on the rear side of the second additional reflector 26, and prevent the light other than the light which is emitted from the light source 12a and is then reflected by the first additional reflector 24, from traveling to the second additional reflector 26.

The first light-shielding member 32 is integrally formed with the second additional reflector 26, and extends from the inner peripheral edge of the second additional reflector 26 toward the rear side thereof so as to be form in a cylindrical shape. Meanwhile, the second light-shielding member 34 is integrally formed with the third additional reflector 28, and extends from the inner peripheral edge of the third additional reflector 28 toward the front side thereof so as to form a conical shape. Furthermore, a narrow annular gap using the optical axis Ax as a central axis thereof is formed between the rear end of the first light-shielding member 32 and the front end of the second light-shielding member 34.

Accordingly, among the light that is emitted from the light source 12a and reflected by the first additional reflector 24, the only light passing through the annular gap travels to the second additional reflector 26. As a result, the quantity of light traveling to the additional lens 30 is reduced, and the first and second light-shielding members 32 and 34 prevent yellow light from traveling to the second additional reflector 26. The yellow light is emitted from enclosed materials, which serve as pseudo light sources and are deposited on the bottom of a discharge chamber of the light source bulb 12.

In addition, the first and second light-shielding members 32 and 34 prevent direct light emitted from the light source 12a from traveling to the second additional reflector 26 or the additional lens 30.

Figure 4:
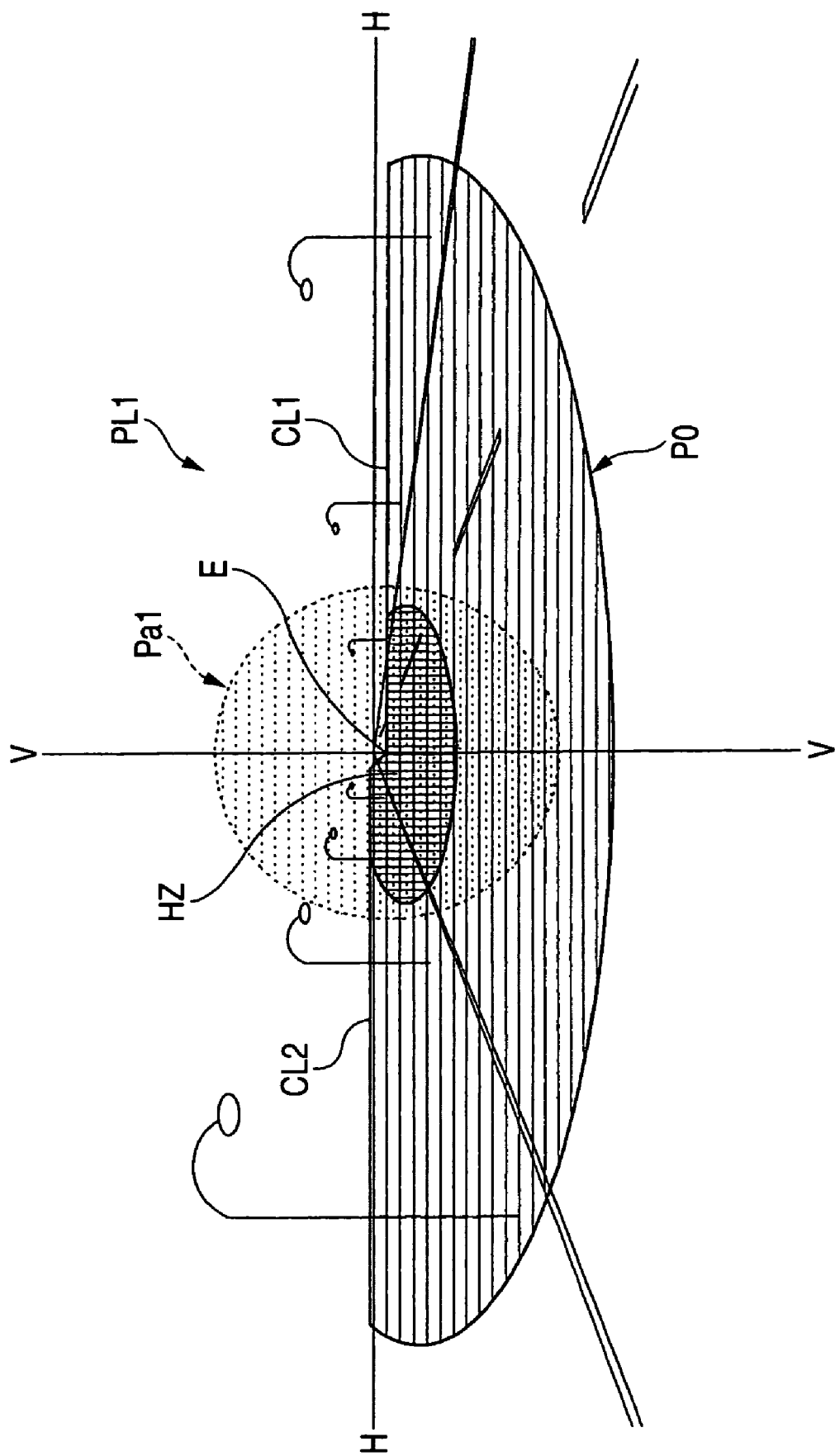
FIG. 4 is a perspective view showing a light distribution pattern, which is formed on a virtual vertical screen placed at a position 25 m ahead of the vehicle headlamp by the light radiated from the vehicle headlamp toward the front side thereof.

FIG. 4 is a perspective view showing a low-beam light distribution pattern, which is formed on a virtual vertical screen placed at a position 25 m ahead of the vehicle headlamp by the light radiated from the vehicle headlamp 10 according to the present embodiment toward the front side thereof.

The low-beam light distribution pattern PL1 is a low-beam light distribution pattern of left light distribution, and is composed of a composite light distribution pattern, which includes a basic light distribution pattern P0 and an additional light distribution pattern Pa1.

The basic light distribution pattern P0 is a light distribution pattern forming a main part of the low-beam light distribution pattern PL1, and is formed by the light passing through the projection lens 16.

The basic light distribution pattern P0 has cutoff lines CL1 and CL2, which form a step shape at the upper edge thereof. The cutoff lines CL1 and CL2 extend in the horizontal direction so as to form a step shape in the vicinity of a line V-V vertically passing though a point H-V, which is a vanishing point in the front direction of the headlamp. An opposite lane portion disposed on the right side of the line V-V forms a lower cutoff line CL1, and a lane portion disposed on the left side of the V-V line forms an upper cutoff line CL2, which rises from the lower cutoff line CL1 by an inclined portion.

In the basic light distribution pattern P0, an elbow point E, which is an intersection of the lower cutoff line CL1 and the line V-V, is positioned at a position, which is disposed below the point H-V about 0.5 to 0.6°. This is due to the fact that the optical axis Ax extends in a direction to be inclined downward about 0.5 to 0.6° with respect to the longitudinal direction of the vehicle. Further, a hot zone HZ, which is a high-intensity region, is formed in the low-beam light distribution pattern PL1 to surround the elbow point E.

The basic light distribution pattern P0 is formed as a reversed projection image of a light source image. The light source image is formed on the rear focal plane (that is, a rear focal plane including the rear focal point F) of the projection lens 16 by the light, which is emitted from the light source 12a and is then reflected by the reflector 14. The cutoff lines CL1 and CL2 are formed as reverse projection images of the upper edge 18a of the shade 18.

The additional light distribution pattern Pa1 is a light distribution pattern, which is formed in addition to the basic light distribution pattern P0, and is formed by the light passing through the additional lens 30.

Since the light passing through the additional lens 30 is to be parallel to the optical axis Ax, the additional light distribution pattern Pa1 is formed in the shape of a spot using the elbow point E as a center thereof. Since the additional light distribution pattern Pa1 is a light distribution pattern to also be distributed above the cutoff lines CL1 and CL2, the light passing through the additional lens 30 travels to the eyes of a driver of the oncoming vehicle together with stray light included in the light passing through the projection lens 16. Moreover, a light-emitting area of the entire headlamp becomes larger than that of a conventional projector-type vehicle headlamp as much as the quantity of light passing through the additional lens 30, whereby the appearance of the headlamp is increased. In this case, since the quantity of light passing through the additional lens 30 is reduced, the additional light distribution pattern Pa1 is formed, whereby it is possible for the headlamp not to cause glare to the driver of the oncoming vehicle.

As described above, in the vehicle headlamp 10 according to the present exemplary embodiment, the reflector 14 reflects the light emitted from the light source 12a, which is disposed on the optical axis Ax, toward the front side of the reflector and the optical axis Ax, on the rear side of the rear focal point F of the projection lens 16, which is disposed on the optical axis Ax extending in the longitudinal direction of the vehicle. Furthermore, the vehicle headlamp includes the first additional reflector 24 and the second additional reflector 26. The first additional reflector 24 is provided on the rear side of the light source 12a, and reflects the light emitted from the light source 12a toward the front side of the reflector in the direction in which the light is apart from the optical axis Ax. The second additional reflector 26 is provided on the rear side of the projection lens 16 and in the vicinity of the outer peripheral edge of the projection lens 16, and reflects the light, which is emitted from the light source 12a and is then reflected by the first additional reflector 24, toward the rear side of the reflector in the direction in which the light is apart from the optical axis Ax. The third additional reflector 28 is provided on the rear side of the second additional reflector 26. The third additional reflector 28 reflect the light, which is reflected by the first additional reflector 24 and is then reflected by the second additional reflector 26, toward the front side thereof. In addition, the additional lens 30 having a substantially wedge-shaped cross-section is provided on the periphery of the projection lens 16 so that the light, which is reflected by the second additional reflector 26 and is then reflected by the third additional reflector 28, travels toward the front side of the reflector as light parallel to the optical axis Ax. Accordingly, it is possible to obtain the following effects.

That is, the light emitted from the light source 12a is sequentially reflected by the first, second, and third additional reflectors 24, 26, and 28 in this order. By emitting light in the order of the reflectors, this allows the light to be parallel to the optical axis Ax by the additional lens 30 provided on the outer periphery of the projection lens 16, and travels toward the front side of the reflector. Accordingly, it is possible to increase the light-emitting area of the entire headlamp so as to be larger than that of a conventional projector-type vehicle headlamp, as much as the quantity of the light passing through the additional lens, whereby it is possible to improve the appearance of the headlamp with respect to the driver of the oncoming vehicle. Specifically, the additional light distribution pattern Pa1, which is formed by the light passing through the additional lens 30, is a light distribution pattern to be also distributed above the cutoff lines CL1 and CL2. Therefore, the light passing through the additional lens 30 can travel to the eyes of the driver of the oncoming vehicle together with the stray light included in the light passing through the projection lens 16. As a result, it is possible to improve the safety conditions during the driving of a vehicle.

In addition, since the additional lens 30 is formed so as to have a substantially wedge-shaped cross-section, it is possible to easily dispose the additional lens 30 along the surface shape of the projection lens 16. Accordingly, it is possible to coordinate the designs of the additional lens 20 and the projection lens 16 with each other, and to reduce the size of a headlamp.

Moreover, the light emitted from the light source 12a is sequentially reflected by the first, second, and third additional reflectors 24, 26, and 28 in this order, and then travels to the additional lens 30. Accordingly, whenever the light is reflected by each of the additional reflectors, it is possible to focus the light emitted from the light source 12a. As a result, it is possible to properly set the quantity of the light, which is reflected by the third additional reflector 28 and then travels to the additional lens 30, relatively small. For this reason, since the quantity of the light passing through the additional lens 30 can be also set properly, the additional light distribution pattern Pa1 is formed, it is possible for the headlamp not to cause glare to the driver of the oncoming vehicle.

According to the present exemplary embodiment, the additional lens 30 for improving the appearance of the projector-type vehicle headlamp 10 can be disposed along the surface shape of the projection lens 16, and the quantity of light passing through the additional lens 30 can be controlled so as not to be excessively increased. Therefore, it is possible for the headlamp not to cause glare to the driver of the oncoming vehicle.

Specifically, the additional lens 30 of the vehicle headlamp 10 according to the present embodiment is an annular lens, which is composed of a peripheral portion of a convex meniscus lens, and is provided along the outer peripheral edge of the projection lens 16. Accordingly, it is possible to coordinate the designs of the additional lens 20 and the projection lens 16 with each other, and to further promote the reduction in the size of a headlamp.

Further, according to the vehicle headlamp 10 of the present exemplary embodiment, the cross-section, which is taken along the plane including the optical axis Ax, of the reflection surface 24a of the first additional reflector 24 is formed in the shape of the first parabola P1, which uses the emission center A of the light source 12a as a focal point. Furthermore, the cross-section, which is taken along the plane including the optical axis Ax, of the reflection surface 26a of the second additional reflector 26 is formed in the shape of the second parabola P2, which uses the axis Ax2 parallel to the axis Ax1 of the first parabola P1 as a symmetry axis and uses the point B disposed on the rear side of the second reflector 26 as a focal point. In addition, the cross-section, which is taken along the plane including the optical axis Ax, of the reflection surface 28a of the third additional reflector 28 is formed in the shape of a conic section H, which corresponds to a first focal point B, of a hyperbola. The hyperbola uses the focal point B of the second parabola P2 as a first focal point, and uses a point C disposed on the optical axis Ax on the rear side of the light source 12a as a second focal point. Moreover, since the focal point of the additional lens 30 is positioned at the second focal point C of the hyperbola, it is possible to lengthen the focal distance of the additional lens 30. Accordingly, even though the additional lens 30 of the present embodiment is formed to have a relatively small thickness, the light, which is reflected by the third additional reflector 28 and then travels to the additional lens 30, can travel toward the front side of the reflector in the form of the light parallel to the optical axis Ax.

Further, the additional lens 30 is formed to have a small thickness. Accordingly, even though the additional lens is composed of an injection-molding product made of a transparent resin, sinkage hardly occurs. As a result, it is possible to improve the optical precision of the additional lens.

Furthermore, according to the present exemplary embodiment, the emission center A of the light source 12a is disposed on the optical axis Ax. In addition, the point C, which is the second focal point of the hyperbola and the focal point of the additional lens 30, is disposed on the optical axis Ax. Accordingly, the additional lens 30 has a constant cross-section that is the substantially wedge-shape in the circumferential direction thereof, and the light passing through the additional lens 30 can be made parallel to the optical axis Ax.

Moreover, in the vehicle headlamp 10 according to the present exemplary embodiment, the first and second light-shielding members 32 and 34 are provided on the rear side of the second additional reflector 26, and prevent the light other than the light, which is emitted from the light source 12a and is then reflected by the first additional reflector 24, from traveling to the second additional reflector 26. Therefore, it is possible to reliably prevent the additional light distribution pattern Pa1, which is formed by the light passing through the additional lens 30, from excessively illuminating. In addition, when the light source 12a is composed of a discharge light-emitting part of the light source bulb 12, the enclosed materials deposited on the bottom of a discharge chamber of the light source bulb 12 serve as pseudo light sources. As a result, there is a possibility that the additional lens 30 may shine yellow. However, since the vehicle headlamp 10 according to the present embodiment is provided with the first and second light-shielding members 32 and 34, it is possible to prevent the yellow light emitted from enclosed materials, which serve as pseudo light sources and are deposited on the bottom of a discharge chamber of the light source bulb 12, from traveling to the second additional reflector 26. Therefore, it is possible to prevent the additional lens 30 from shining yellow.

Furthermore, in the above-mentioned first exemplary embodiment, the reflection surfaces 26a and 28a of the second and third additional reflectors 26 and 28 are formed on the overall periphery with respect to the optical axis Ax. However, the reflection surface 26a of the second additional reflector 26 can be formed in an arc shape at a portion corresponding to a predetermined range of angles. In this case, the portion corresponding to a predetermined range of angles includes a portion to which the light (which is emitted from the light source 12a and is then reflected by the first additional reflector 24) travels. Similarly, the reflection surface 28a of the third additional reflector 28 can be formed in an arc shape at a portion corresponding to a predetermined range of angles. In this case, the portion corresponding to a predetermined range of angles includes a portion to which the light (which is reflected by the first additional reflector 24 and is then reflected by the second additional reflector 26) travels. However, if the reflection surfaces are formed on the overall periphery as described in the first embodiment, it is possible to improve the appearance of the headlamp during a non-lighting period of the vehicle headlamp.

Second Exemplary Embodiment

A second exemplary embodiment of the invention will be described.

Figure 5:
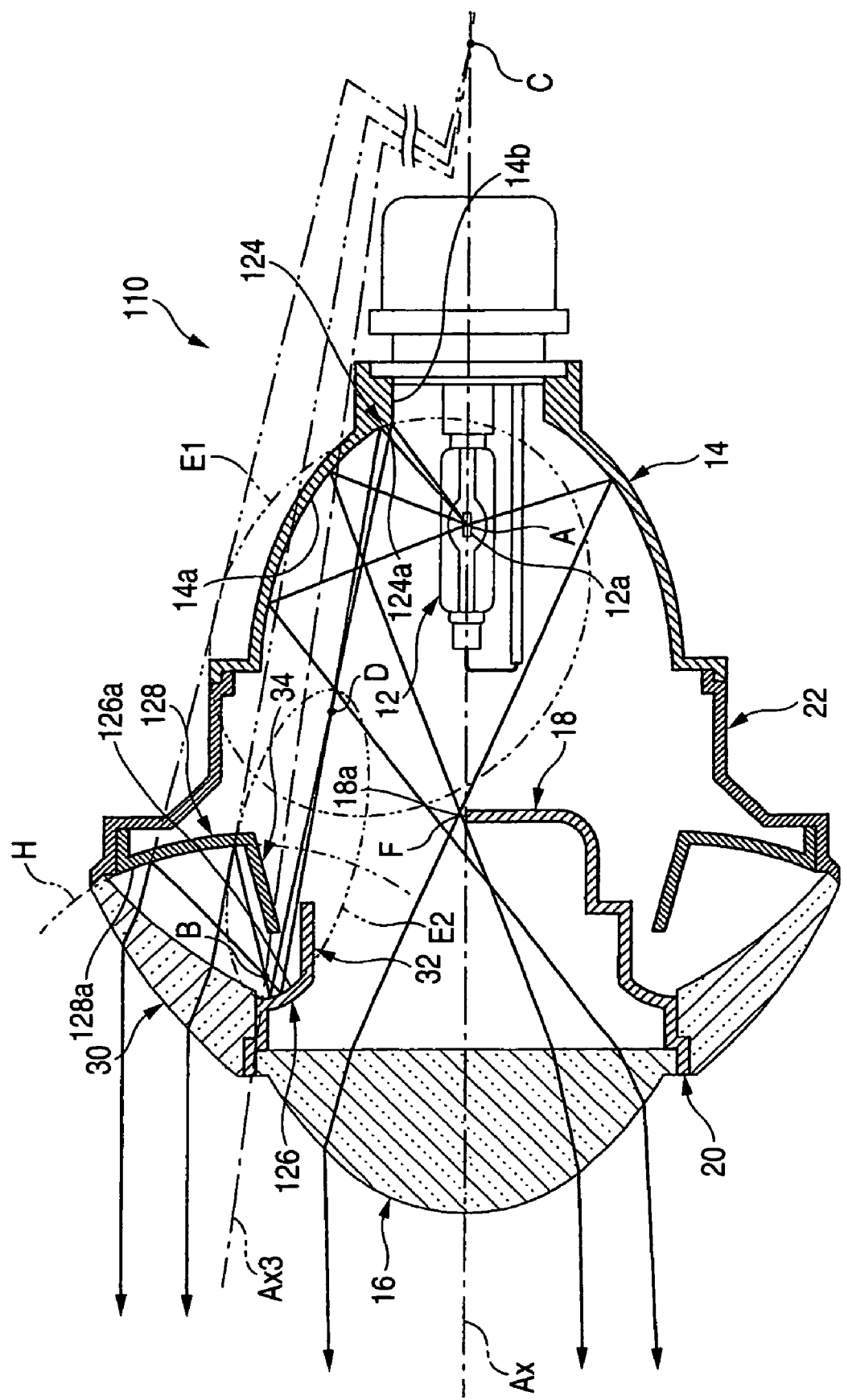
FIG. 5 is a side cross-sectional view showing a vehicle headlamp according to a second exemplary embodiment of the invention.

FIG. 5 is a side cross-sectional view showing a vehicle headlamp 110 according to a second exemplary embodiment of the invention.

As shown in FIG. 5, the basic structure of the vehicle headlamp 110 is entirely the same as that in the first exemplary embodiment, and the surface shapes of the reflection surfaces 124a and 126a of the first and second reflectors 124 and 126 are different from those of the first and second reflectors 24 and 26 of the vehicle headlamp 10 according to the first exemplary embodiment.

That is, the cross-section, which is taken along the plane including the optical axis Ax, of the reflection surface 124a of the first additional reflector 124 of the present exemplary embodiment is formed in the shape of a first ellipse E1, which uses the emission center of the light source 12a as a first focal point and uses a point D disposed on the front side of the first additional reflector 124 as a second focal point. Accordingly, the reflection surface 124a is configured such that the light emitted from the light source 12a is reflected as light converged to the second focal point D of the first ellipse E1.

In addition, the cross-section of the reflection surface 126a of the second additional reflector 126 of the present embodiment is formed in the shape of a second ellipse E2, which uses the second focal point D of the first ellipse E1 as a first focal point and uses a point B disposed on the rear side of the second additional reflector 126 as a second focal point. Accordingly, the reflection surface 126a is configured such that the light, which travels in the form of divergent light from the second focal point D after being reflected by the first additional reflector 124 and converged to the second focal point B of the second ellipse E2, is reflected as light converged to the second focal point B of the second ellipse E2.

Furthermore, even in the present exemplary embodiment, the light path of the light reflected by a third additional reflector 128, and the light path of the light passing through the additional lens 30 are the same as those in the first exemplary embodiment.

Accordingly, even when the structure of the present exemplary embodiment is applied, it is possible to obtain substantially the same effects as those in the first exemplary embodiment.

Third Exemplary Embodiment

A third exemplary embodiment of the invention will be described.

Figure 6:
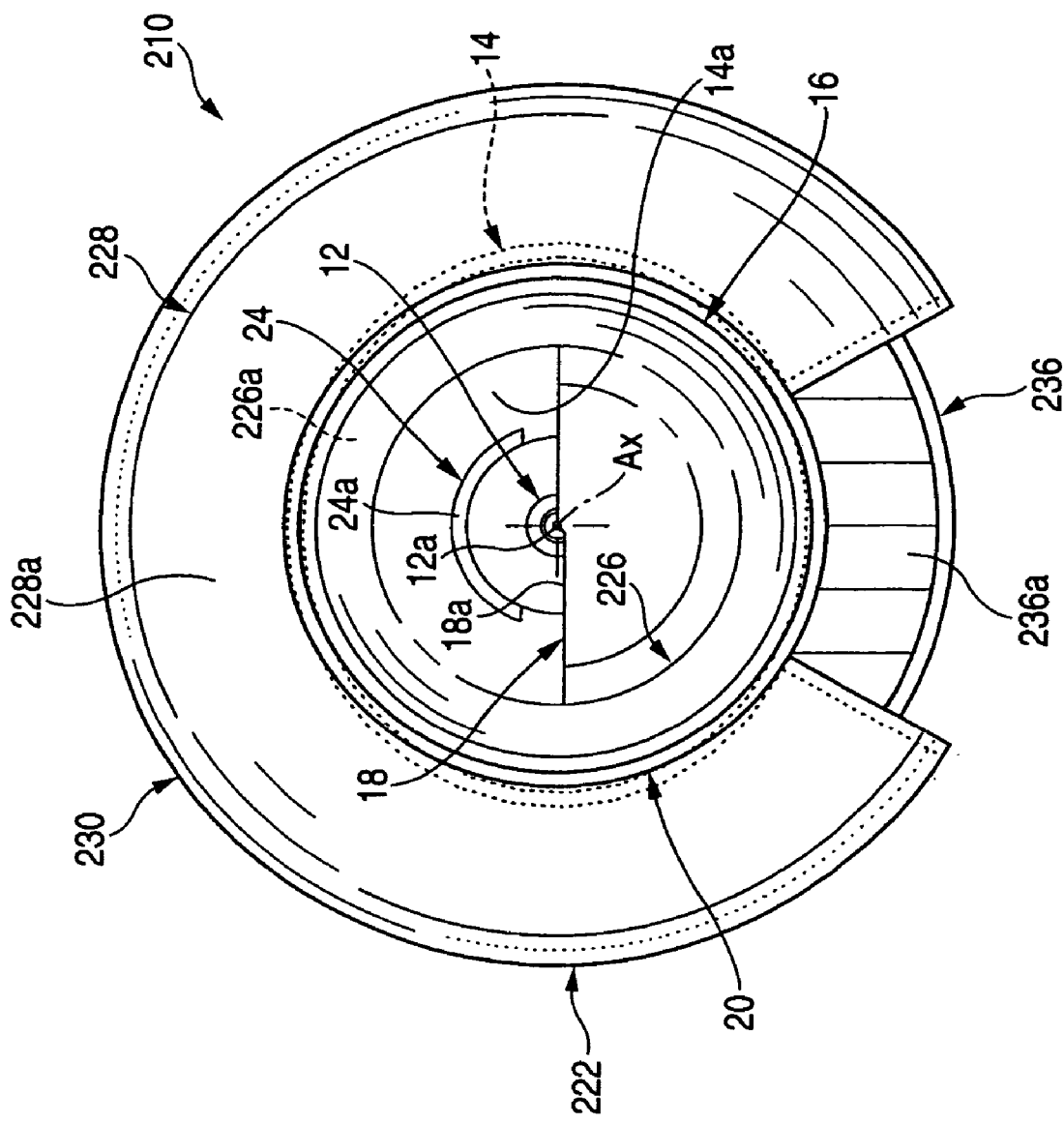
FIG. 6 is a front view showing a vehicle headlamp according to a third exemplary embodiment of the invention.
Figure 7:
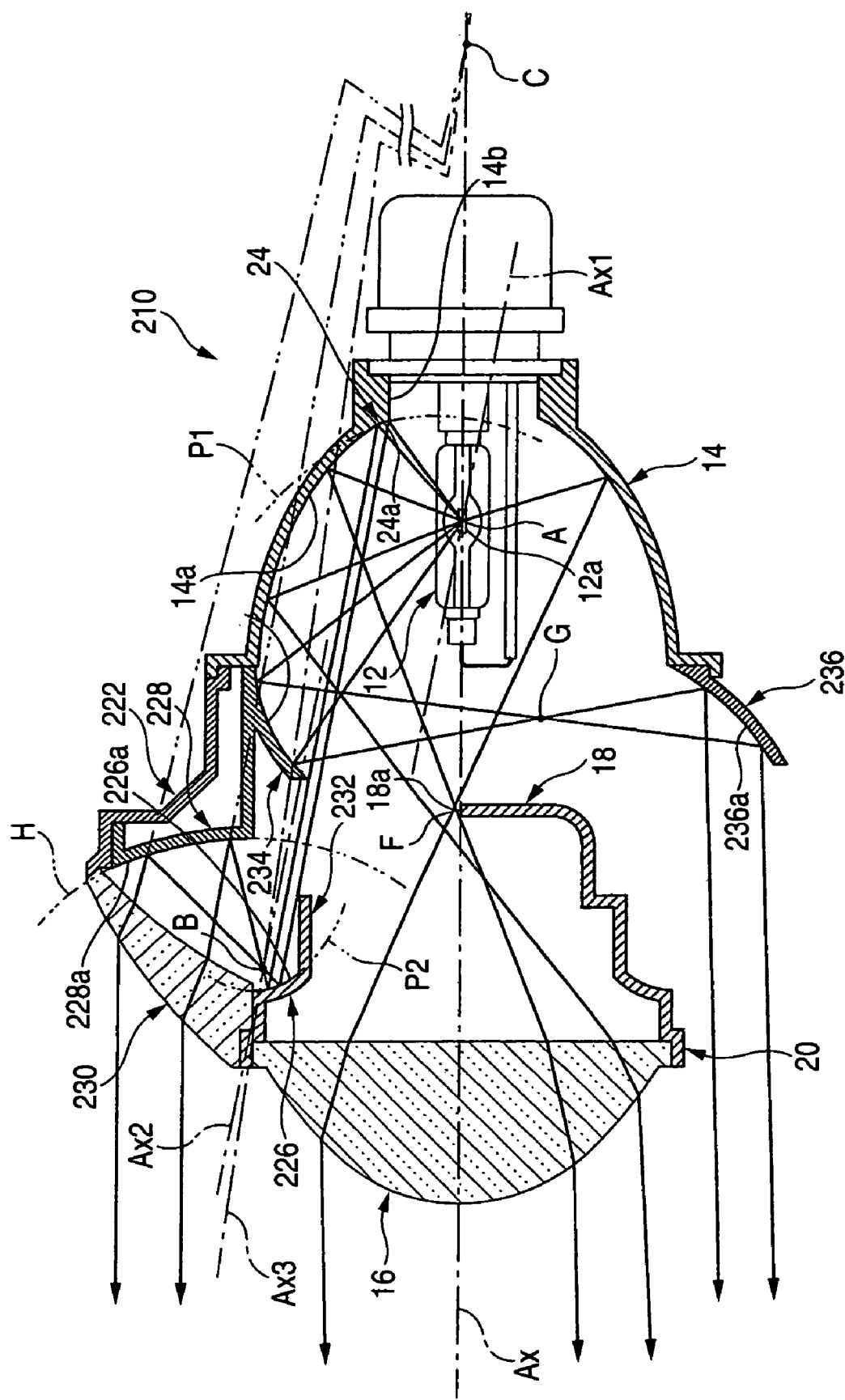
FIG. 7 is a side cross-sectional view showing the vehicle headlamp according to the third exemplary embodiment.

FIG. 6 is a front view of a vehicle headlamp 210 according to a third exemplary embodiment of the invention, and FIG. 7 is a side cross-sectional view thereof.

As shown in FIGS. 6 and 7, the basic structure of the vehicle headlamp 210 is entirely the same as that in the first exemplary embodiment, and the structure of a second light-shielding member 234 is different from that of the vehicle headlamp 10 according to the first exemplary embodiment.

That is, the second light-shielding member 234 of the third exemplary embodiment is composed of a fourth additional reflector, which is provided on the front-upper side of the light source 12*a* and reflects the direct light emitted from the light source 12*a* toward the lower side. The front edge of the second light-shielding member 234 prevents the light other than the light, which is emitted from the light source 12*a* and is then reflected by the first additional reflector 24, from traveling to a second additional reflector 226.

In addition, the vehicle headlamp according to the third exemplary embodiment is provided with a fifth additional reflector 236 below the optical axis Ax. The fifth additional reflector 236 reflects the light, which is emitted from the light source 12*a* and is then reflected by the fourth additional reflector 234, such that the light travels toward the front side of the reflector below the projection lens 16.

Furthermore, in the present exemplary embodiment, the second additional reflector 226, the third additional reflector 228, the additional lens 230, the first light-shielding member 232, and the second holder 222 are configured such that the second additional reflector 26, the third additional reflector 28, the additional lens 30, the first light-shielding member 32, and the second holder 22 according to the first exemplary embodiment have an opening corresponding to a predetermined range of angles. As a result, the fifth additional reflector 236 is exposed to the outside as seen from the front side of the vehicle headlamp.

The cross-section of the reflection surface 234*a* of the fourth additional reflector 234 is formed in the shape of an ellipse, which uses the emission center A of the light source 12*a* as a first focal point and uses a point G disposed directly below the fourth additional reflector 234 and below the optical axis Ax as a second focal point. Accordingly, the reflection surface 234*a* is configured such that the light emitted from the light source 12*a* is reflected as light converged to the second focal point G.

In addition, the cross-section of the reflection surface 236*a* of the fifth additional reflector 236 is formed in the shape of a parabola, which uses the second focal point G of the ellipse as a focal point and uses the axis slightly inclined downward with respect to the optical axis as a symmetry axis. A plurality of diffuse reflection elements is formed on the surface, which is formed in the shape of the parabola, in the shape of vertical stripes. Accordingly, the reflection surface 236*a* is configured such that the light, which travels in the form of divergent light from the second focal point G after being reflected by the fourth additional reflector 234 and converged to the second focal point G, is reflected as light that distributed slightly downward to the right and left sides.

Figure 8:
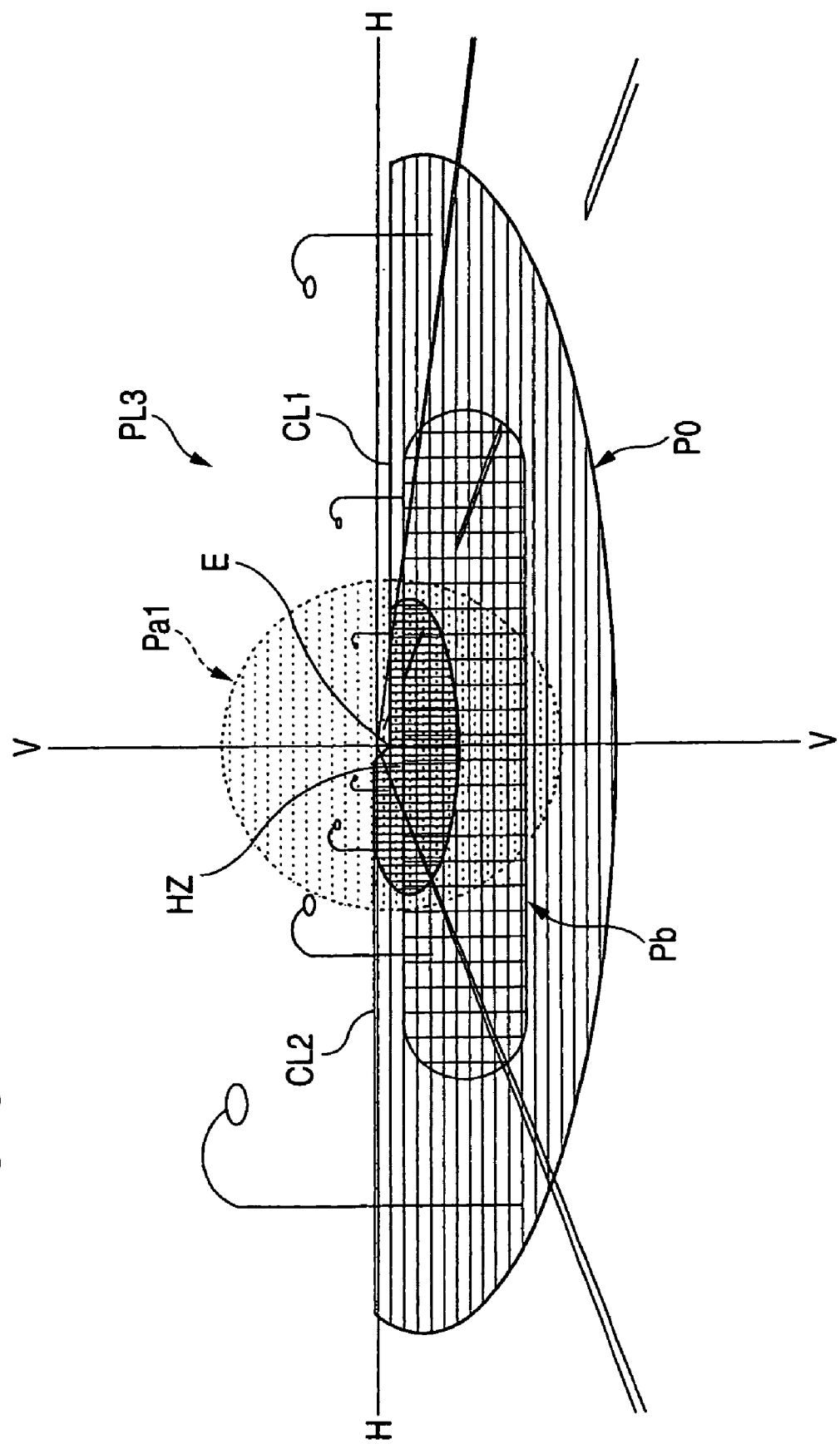
FIG. 8 is a perspective view showing a light distribution pattern, which is formed on the virtual vertical screen by the light radiated from the vehicle headlamp according to the third exemplary embodiment toward the front side thereof.

FIG. 8 is a perspective view showing a low-beam light distribution pattern, which is formed on the virtual vertical screen placed at a position 25 m ahead of the vehicle headlamp by the light radiated from the vehicle headlamp 210 according to the present exemplary embodiment toward the front side thereof.

The low-beam additional light distribution pattern PL3 is composed of a composite light distribution pattern, which includes a basic light distribution pattern P0, an additional light distribution pattern Pa1, and an additional light distribution pattern Pb.

The basic light distribution pattern P0 and the additional light distribution pattern Pa1 are the same as in the first exemplary embodiment.

The additional light distribution pattern Pb is a light distribution pattern, which is formed in addition to the basic light distribution pattern P0, and is formed by the light reflected by the fifth additional reflector 236.

The additional light distribution pattern Pb is composed of a horizontal light distribution pattern, which is formed in the vicinity of cutoff lines CL1 and CL2 and is spread to the right and left sides of a line V-V, so as to add brightness in the vicinity of a hot zone HZ.

Accordingly, even when the structure of the present exemplary embodiment is applied, it is possible to obtain substantially the same effects as those in the first exemplary embodiment.

Specifically, according to the present exemplary embodiment, the additional light distribution pattern Pb formed by the light, which is emitted from the light source 12*a* and is then sequentially reflected by the fourth and fifth additional reflectors 234 and 236 in this order, is added to the basic light distribution pattern P0 formed by the light passing through the projection lens 16. Therefore, it is possible to improve the appearance of the low-beam additional light distribution pattern PL3 with respect to a road surface on the front side of the vehicle, whereby it is possible to effectively utilize the light emitted from the light source 12*a*.

Fourth Exemplary Embodiment

A fourth exemplary embodiment of the invention will be described.

Figure 9:
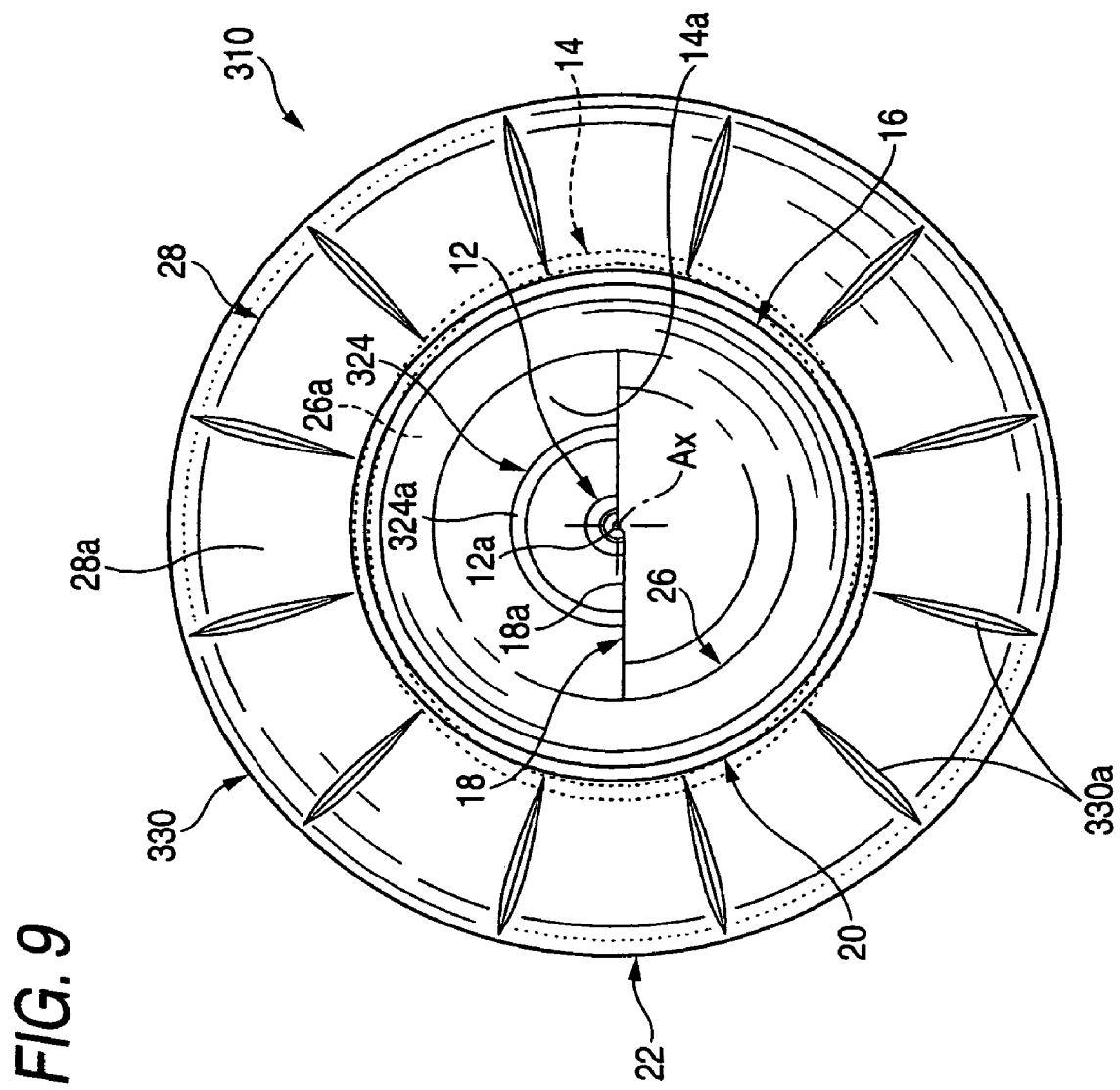
FIG. 9 is a front view showing a vehicle headlamp according to a fourth exemplary embodiment of the invention.
Figure 10:
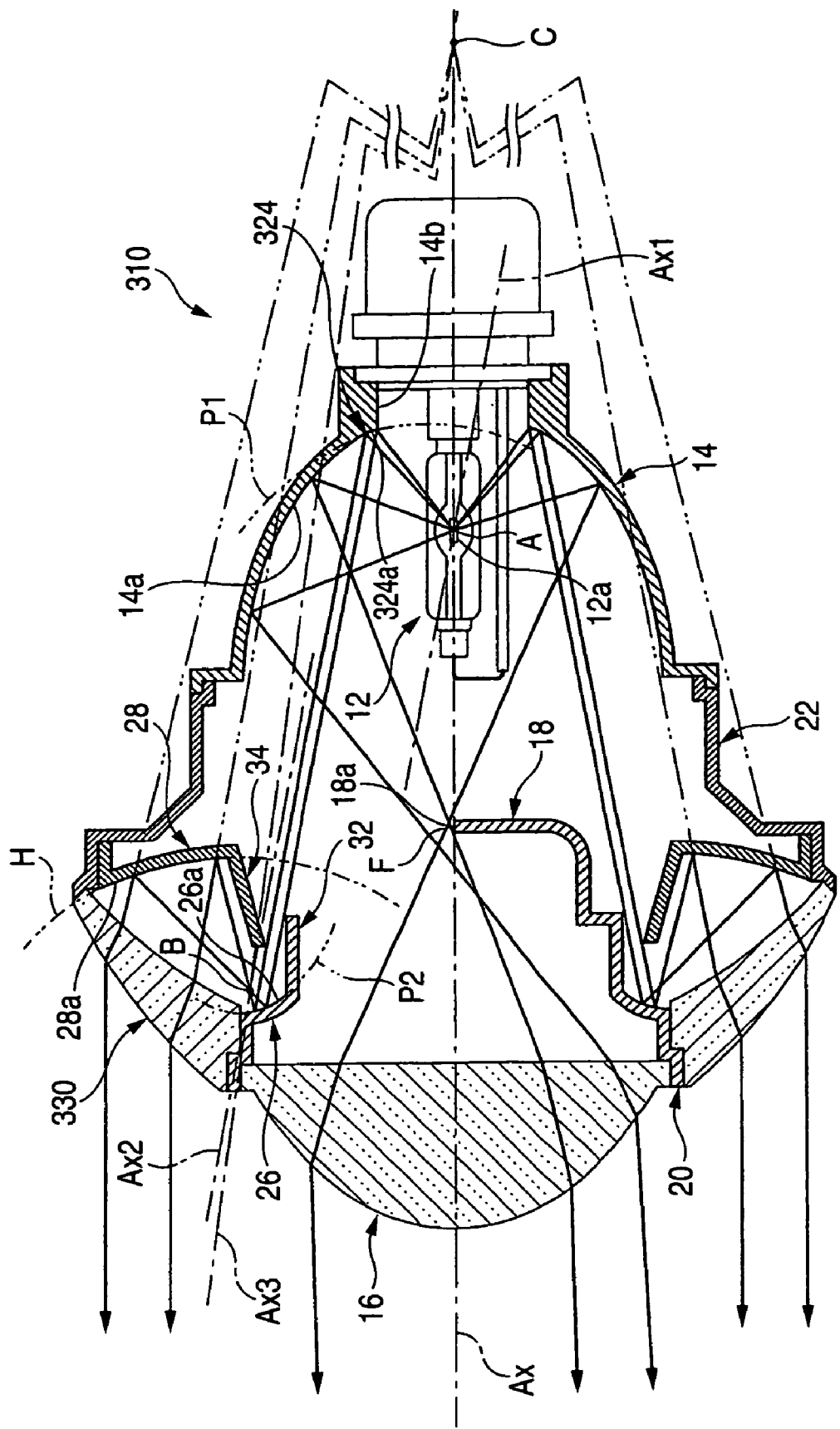
FIG. 10 is a side cross-sectional view showing the vehicle headlamp according to the fourth exemplary embodiment.
Figure 11:
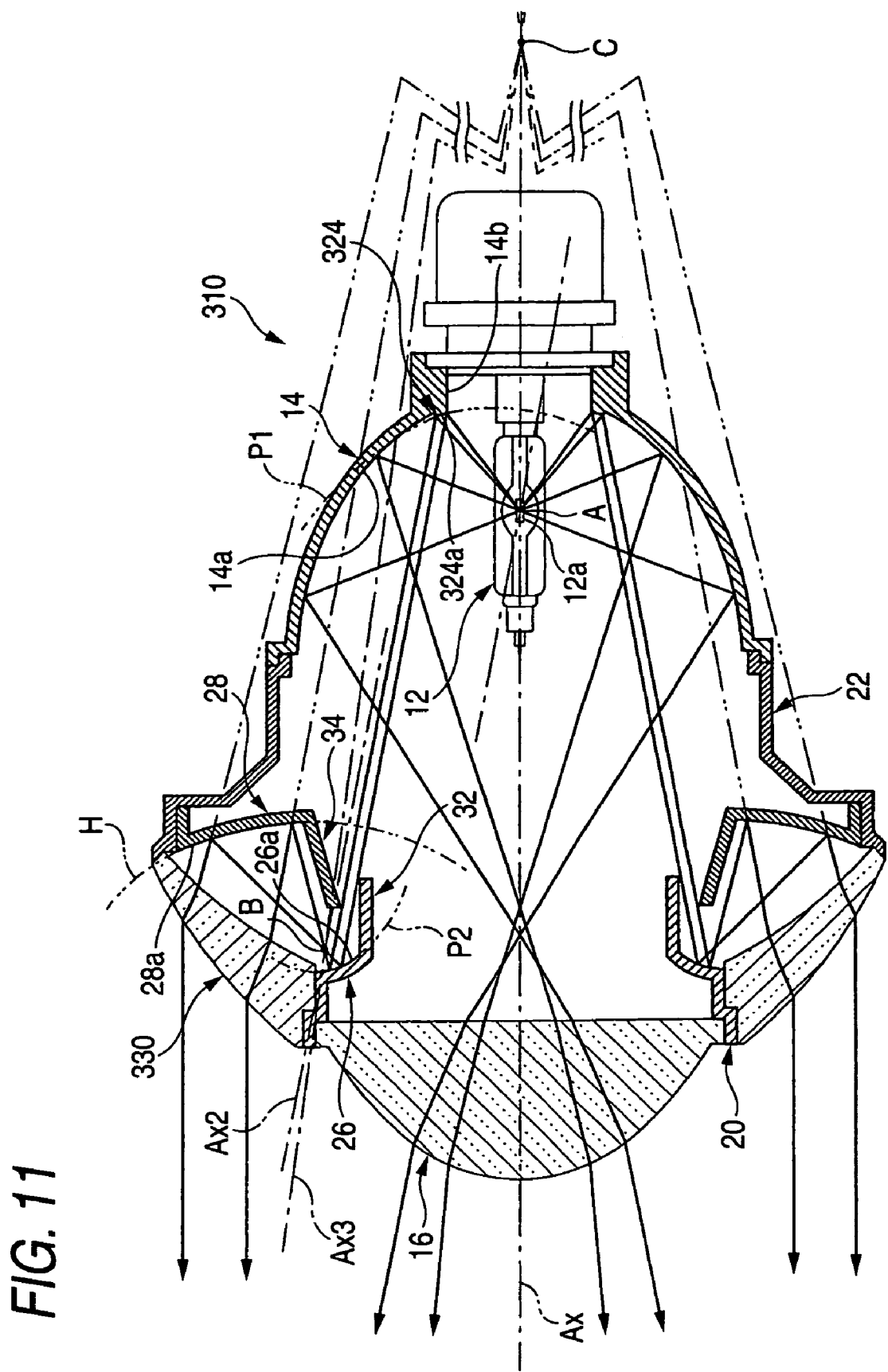
FIG. 11 is a plan cross-sectional view showing the vehicle headlamp according to the fourth exemplary embodiment of the invention.

FIG. 9 is a front view of a vehicle headlamp 310 according to a fourth exemplary embodiment of the invention, FIG. 10 is a side cross-sectional view thereof, and FIG. 11 is a plan cross-sectional view thereof.

As shown in FIGS. 9 to 11, the basic structure of the vehicle headlamp 310 is entirely the same as that in the first exemplary embodiment. However, the fourth exemplary embodiment is different from the first exemplary embodiment in that the reflection surface 324*a* of the first additional reflector 324 is formed to have an annular shape on the overall periphery with respect to the optical axis Ax and a plurality of V-shaped grooves 330*a* is formed on the surface of the additional lens 330 so as to have a predetermined interval in the circumferential direction of the additional lens with respect to the optical axis Ax. The number of the V-shaped grooves 330*a* is twelve and the grooves are arrayed at an interval of 30°.

According to the present exemplary embodiment, the light, which is emitted from the light source 12*a* and is then sequentially reflected by the first, second, and third additional reflectors 324, 26, and 28 in this order, travels through the overall peripheral portion of the additional lens 330 toward the front side. Accordingly, the additional lens 330 shines in an annular shape.

Meanwhile, radial dark portions are formed on the annular light-emitting part of the additional lens 330 in the radial direction. That is, since the plurality of V-shaped grooves 330*a* is formed on the surface of the additional lens 330, the plurality of V-shaped grooves 330*a* does not shine due to the total reflection caused by the grooves and the portions of the additional lens 330 except for the grooves shine.

Figure 12:
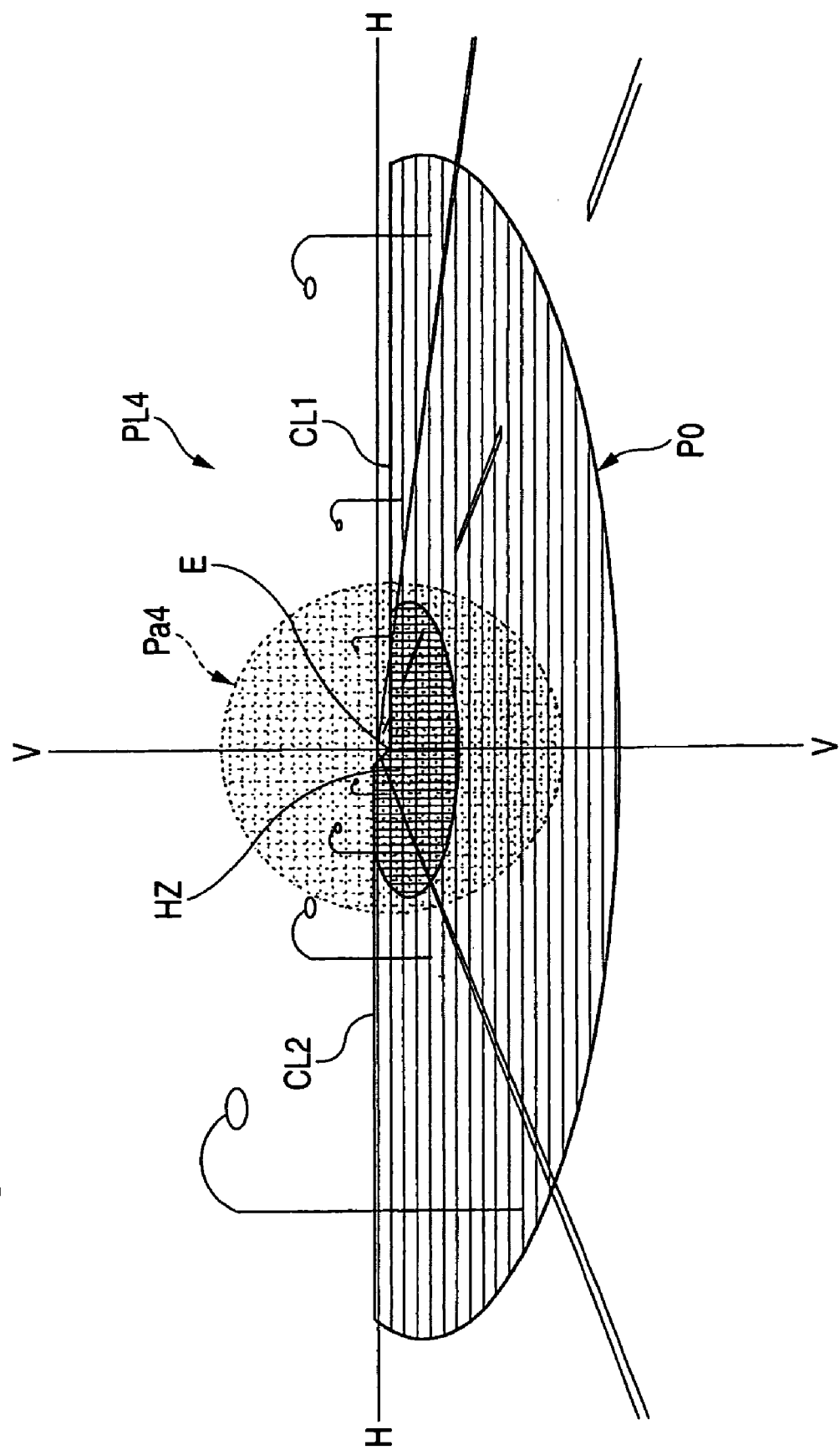
FIG. 12 is a perspective view showing a light distribution pattern, which is formed on the virtual vertical screen by the light radiated from the vehicle headlamp according to the fourth exemplary embodiment toward the front side thereof.

FIG. 12 is a perspective view showing a low-beam light distribution pattern, which is formed on the virtual vertical screen placed at a position 25 m ahead of the vehicle headlamp by the light radiated from the vehicle headlamp 210 according to the present exemplary embodiment toward the front side thereof.

A low-beam additional light distribution pattern PL4 is composed of a composite light distribution pattern, which includes a basic light distribution pattern P0 and an additional light distribution pattern Pa4.

The basic light distribution pattern P0 is the same as in the first exemplary embodiment.

The additional light distribution pattern Pa4 is a light distribution pattern, which is formed by the light passing through the additional lens 330, and is composed of a spot-shaped light distribution pattern that has substantially the same shape as that of the additional light distribution pattern Pa1 of the first exemplary embodiment. However, the additional light distribution pattern Pa4 is generally brighter than the additional light distribution pattern Pa1 of the first exemplary embodiment. This is due to the fact that the light passing through the additional lens 330 is obtained from the overall peripheral portion of the additional lens 330.

Accordingly, even when the structure of the present exemplary embodiment is applied, it is possible to obtain substantially the same effects as those in the first exemplary embodiment.

Further, according to the present exemplary embodiment, the light passes through the overall peripheral portion of the additional lens 330. Accordingly, it is possible to improve the appearance of the headlamp with respect to the driver of the oncoming vehicle, thereby further improving safety conditions.

In this case, the light-emitting area of the additional lens 330 is larger than that of the additional lens 330 of the first exemplary embodiment. Accordingly, even though the additional light distribution pattern Pa4 formed by the light passing through the additional lens 330 is composed of a light distribution pattern generally brighter than the additional light distribution pattern Pa1 of the first exemplary embodiment, the additional lens 330 can be controlled so as to have the same brightness as that of the additional lens 330 of the first exemplary embodiment. As a result, it is possible for the headlamp not to cause glare to the driver of the oncoming vehicle.

Moreover, in the present exemplary embodiment, a plurality of V-shaped grooves 330a is formed on the surface of the additional lens 330 so as to have a predetermined interval in the circumferential direction with respect to the optical axis Ax. Therefore, when the headlamp is illuminated, it is possible for the V-shaped grooves 330a not to shine. As a result, it is possible to easily get the driver of the oncoming vehicle to perceive that the shine of the portion corresponding to the additional lens 330 is different from that corresponding to the projection lens 16. For this reason, even when the vehicle headlamp 310 is a projector-type vehicle headlamp, the portion except for the projection lens 16 shines. Therefore, it is possible not to inconvenience r the driver of the oncoming vehicle.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:
   a projection lens disposed on an optical axis extending in a longitudinal direction of a vehicle;
   a light source disposed on a rear side of a rear focal point of the projection lens;
   a reflector, wherein light from the light source is reflected on the reflector to a front side toward the optical axis;
   a first additional reflector provided on a rear side of the light source, wherein the light from the light source is reflected on the first additional reflector in a direction apart from the optical axis;
   a second additional reflector provided on a rear side of the projection lens and in a vicinity of an outer peripheral edge of the projection lens, wherein the light reflected on the first additional reflector is reflected on the second additional reflector to a rear side of the second additional reflector in a direction apart from the optical axis;
   a third additional reflector provided on a rear side of the second additional reflector, wherein the light reflected on the second additional reflector is reflected on the third additional reflector to a front side of the third additional reflector; and
   an additional lens provided on an outer periphery of the projection lens, wherein the light reflected on the third additional reflector passes through the additional lens and travels to a front side of the additional lens, substantially parallel to the optical axis.

2. The vehicle headlamp according to claim 1, wherein the additional lens has a substantially wedge-shaped cross-section.

3. The vehicle headlamp according to claim 1, wherein the additional lens is an annular lens composed of a peripheral portion of a convex meniscus lens and is provided along an outer peripheral edge of the projection lens.

4. The vehicle headlamp according to claim 1, wherein the additional lens is a portion of an annular lens composed of a peripheral portion of a convex meniscus lens and is provided along the outer peripheral edge of the projection lens.

5. The vehicle headlamp according to claim 1, wherein a reflecting surface of the first additional reflector includes a cross-section taken along a plane including the optical axis in a shape of a first parabola having a focal point on an emission center of the light source,
   a reflecting surface of the second additional reflector includes a cross-section taken along a plane including the optical axis in a shape of a second parabola having an axis parallel to an axis of the first parabola and a focal point on a rear side of the second reflector,
   a reflecting surface of the third additional reflector includes a cross-section taken along a plane including the optical axis in a shape of a hyperbola having a first focal point on the focal point of the second parabola and a second focal point on a point disposed on the rear side of the light source,
   a focal point of the additional lens is positioned in a vicinity of the second focal point of the hyperbola.

6. The vehicle headlamp according to claim 5, wherein the emission center of the light source, the second focal point of the hyperbola, and the focal point of the additional lens are disposed on the optical axis.

7. The vehicle headlamp according to claim 1, wherein a reflecting surface of the first additional reflector includes a cross-section taken along a plane including the optical axis in a shape of a first ellipse having a first focal point on an emission center of the light source and a second focal point on a point disposed on a front side of the first additional reflector,
    a reflecting surface of the second additional reflector includes a cross-section taken along a plane including the optical axis in a shape of a second ellipse having a first focal point on the second focal point of the first ellipse and a second focal point on a point disposed on a rear side of the second additional reflector,
    a reflecting surface of the third additional reflector includes a cross-section taken along a plane including the optical axis in a shape of a hyperbola having a first focal point on the second focal point of the second ellipse and a second focal point on a point disposed on a rear side of the light source, and
    a focal point of the additional lens is positioned in a vicinity of the second focal point of the hyperbola.

8. The vehicle headlamp according to claim 7, wherein the emission center of the light source, the second focal point of the hyperbola, and the focal point of the additional lens are disposed on the optical axis.

9. The vehicle headlamp according to claim 1, further comprising:
    a light-shielding member provided on a rear side of the second additional reflector, wherein the light other than the light emitted from the light source and is then reflected on the first additional reflector is prevented from traveling to the second additional reflector by the light-shielding member.

10. The vehicle headlamp according to claim 9, wherein the first, second, and third additional reflectors are disposed above the optical axis,
    the vehicle headlamp further comprising:
    a forth additional reflector formed on a part of the light-shielding member, wherein the light from the light source emitted directly to the fourth additional reflector is reflected on the fourth additional reflector toward a lower side; and
    a fifth additional reflector disposed below the optical axis, wherein the light reflected on the fourth additional reflector is reflected on the fifth additional reflector and travels toward a front side of the fifth reflector below the projection lens.

11. The vehicle headlamp according to claim 1, further comprising a plurality of V-shaped grooves formed on a surface of the additional lens and extending in a radial direction from the optical axis.

* * * * *